United States Patent
Daido et al.

(10) Patent No.: US 8,119,988 B2
(45) Date of Patent: Feb. 21, 2012

(54) COLLECTION-AMOUNT DETECTION METHOD FOR PARTICULATE MATTERS AND COLLECTION-AMOUNT DETECTION APPARATUS THEREFOR AND EXHAUST-GAS CONVERTING APPARATUS

(75) Inventors: Shigeki Daido, Nishio (JP); Naohisa Oyama, Okazaki (JP); Hitoshi Kato, Toyota (JP); Shinji Tsuji, Okazaki (JP); Juji Suzuki, Toyota (JP); Takayuki Shibuya, Nagoya (JP); Kodo Kawase, Nagoya (JP)

(73) Assignees: Toyota Jidosha Kabushiki Kaisha, Toyota-shi, Aichi-ken (JP); Nippon Soken, Inc., Nishio-shi, Aichi-ken (JP)

( * ) Notice: Subject to any disclaimer, the term of this patent is extended or adjusted under 35 U.S.C. 154(b) by 148 days.

(21) Appl. No.: 12/664,427

(22) PCT Filed: Jun. 20, 2008

(86) PCT No.: PCT/JP2008/061333
§ 371 (c)(1),
(2), (4) Date: Dec. 14, 2009

(87) PCT Pub. No.: WO2009/001776
PCT Pub. Date: Dec. 31, 2008

(65) Prior Publication Data
US 2010/0187089 A1    Jul. 29, 2010

(30) Foreign Application Priority Data
Jun. 22, 2007    (JP) .................. 2007-165266

(51) Int. Cl.
*G01J 5/02*    (2006.01)

(52) U.S. Cl. ................................. 250/339.13
(58) Field of Classification Search ............ 250/339.12, 250/339.13
See application file for complete search history.

(56) References Cited

U.S. PATENT DOCUMENTS
5,157,340 A    10/1992    Walton et al.

FOREIGN PATENT DOCUMENTS
EP    0 506 083    9/1992
GB    2 416 836    2/2006
(Continued)

OTHER PUBLICATIONS
Extended European Search Report for EP 08777477.4 dated Jan. 27, 2011.
(Continued)

*Primary Examiner* — Mark R Gaworecki
(74) *Attorney, Agent, or Firm* — Finnegan, Henderson, Farabow, Garrett & Dunner, LLP

(57) ABSTRACT

A filter 2 for collecting PMs, a microwave transmitter 30 for emitting electromagnetic waves whose frequency is dozens of GHz-a few of THz onto the filter 2, a microwave receiver 31 for detecting an intensity of the electromagnetic waves that have transmitted through the filter 2, and a computing means for computing a collection amount of PMs from the intensity that has been detected with the microwave receiver 31 are included. Since it is possible to detect the distribution of the collection amount of PMs with good accuracy, it is possible to carry out a recycling process in a state where the collection amount does not become too much, and thereby it is possible to make a reducing-agent supply amount into exhaust gases minimum at the time of the recycling process.

10 Claims, 2 Drawing Sheets

FOREIGN PATENT DOCUMENTS

| | | |
|---|---|---|
| JP | 6-212946 | 8/1994 |
| JP | 6-288220 | 10/1994 |
| JP | 7-270296 | 10/1995 |
| JP | 10-220219 | 8/1998 |
| JP | 2002-115531 | 4/2002 |
| JP | 2002-282436 | 10/2002 |
| JP | 2005-325771 | 11/2005 |
| JP | 3882700 | 11/2006 |
| WO | WO 93/00539 | 1/1993 |

OTHER PUBLICATIONS

Decision on Grant for Russian Appl. No. 2009147447/06 dated Apr. 5, 2011.

T. Shibuya et al., "Non-destructive Detection of Carbon in Soot Collection Filters by using a 94 GHz Source," The Joint 32nd International Conference on Infrared and Millimetre Waves and $15^{th}$ International Conference on Terahertz Electronics, pp. 273-274 (2007).

Office Action from Korean Patent Office for KR 10-2009-7026585 dated Sep. 19, 2011.

COLLECTION-AMOUNT DETECTION METHOD FOR PARTICULATE MATTERS AND COLLECTION-AMOUNT DETECTION APPARATUS THEREFOR AND EXHAUST-GAS CONVERTING APPARATUS

CROSS-REFERENCE TO RELATED APPLICATIONS

This application is a national phase application of International Application No. PCT/JP2008/061333, filed Jun. 20, 2008, and claims the priority of Japanese Application No. 2007-165266, filed Jun. 22, 2007, the contents of both of which are incorporated herein by reference.

TECHNICAL FIELD

The present invention relates to a collection-amount detection method for particulate matters and a collection-amount detection apparatus therefor. The present invention can be used in a case of detecting a deposition amount of PMs on a filter that is put in place in the exhaust system of diesel engine, and the like.

BACKGROUND ART

Regarding gasoline engines, harmful components in the exhaust gases have been reduced securely by means of the strict regulations on the exhaust gases and the technological developments capable of coping with those. However, regarding diesel engines, the exhaust-gas conversion is difficult compared with the gasoline engines because of such unique circumstances that the harmful components are discharged as PMs (soot comprising carbon fine particles mainly, high-molecular-weight hydrocarbon fine particles, sulfur-system fine particles such as sulfates, and the like).

As exhaust-gas converting apparatuses for diesel engine that have been developed so far, the following have been known, and can be divided roughly as follows: trapping-type (or wall-flow) exhaust-gas converting apparatuses; and open-type (or straight-flow) exhaust-gas converting apparatuses. Among these, plugged-type honeycomb bodies that are made of ceramic (i.e., diesel PMs filters (hereinafter referred to as "DPFs")) have been known as for one of the trapping-type exhaust-gas converting apparatuses. These DPFs are those which are completed by plugging both of the opposite ends of the cellular openings of ceramic honeycomb structures alternatively in a checkered manner, for instance; and they comprise inlet-side cells that are plugged on the exhaust-gas downstream side, outlet-side cells that neighbor the inlet-side cells and are plugged on the exhaust-gas upstream side, and cellular partition walls that demarcate the inlet-side cells and outlet-side cells; and they are one for suppressing the discharge of PMs by filtering exhaust gases and then collecting PMs therein with the cellular partition walls' pores.

In DPFs, however, since the exhaust pressure loss increases by means of the deposition of PMs, it is necessary to recover them by means of removing deposited PMs regularly by certain means. Hence, burning deposited PMs and then recovering DPFs forcibly have been carried out heretofore by means of such a method, and the like, in which a reducing agent, such as fuel, is added into exhaust gases; the exhaust gases are subjected to temperature rise by burning them with an oxidizing catalyst that is put in place on the upstream side of a DPF; and the resulting high-temperature exhaust gases are then supplied to the DPF.

However, at the time of running idly and during low-load/low-speed running, and the like, where low-exhaust-temperature state continues, no oxidation reaction occurs because the oxidizing catalyst or the like is not activated, and accordingly subjecting the exhaust-gas temperatures to temperature rise becomes difficult. Therefore, it becomes difficult to recover DPFs, and consequently the clogging of the DPFs has progressed.

Accordingly, it is possible to think of raising the exhaust-gas temperatures forcibly when the collection amount of PMs is judged to surpass a predetermined value. For example, data on the discharge amounts of PMs with respect to running conditions are stored in an ECU as a mapping data in advance, then a discharge amount of PMs is estimated from an accumulated value of running times, and then the resulting value is calculated cumulatively to estimate a collection amount of PMs. And, there is a method is available, method in which DPFs are recovered by increasing the exhaust-gas temperatures forcibly at a point of time when the resulting collection amount of PMs is judged to surpass a predetermined amount.

However, in the case of turning the data on the discharge amount of PMs with respect to running conditions into the mapping data, there is such a problem that the error is great. Moreover, as an index for the collection amount of PMs, it has been carried out as well to use the differential pressure between the pressure in front of a DPF and that in the rear thereof. In this method, however, since the value of limit differential pressure, which makes a standard for the judgment, changes greatly depending on the running conditions of engine, it is needed to store data on the limit differential pressures, which result from the respective running conditions, as another mapping data so that the data volume has become enormous. In addition, there is such a problem that the detection sensitivity is low in a range where the collection amount of PMs is less, because the relationship between the collection amount of PMs and the differential pressure is not in a linear relationship.

Hence, in Japanese Unexamined Patent Publication (KOKAI) Gazette No. 2005-325,771, a method is set forth, method in which an electric current or voltage that occurs in a secondary coil being wound around the outer periphery of a collector container is detected at the time of flowing an alternating electric current in a primary coil that is wound around the outer periphery of the collector container, and method in which a collection amount of PMs is then calculated from the resulting value. Since induced electromotive forces that correspond to collection amounts of PMs occur, it is possible to calculate the collection amount of PMs by detecting the electric current or voltage that occurs in the secondary coil.

By the way, DPFs are formed of ceramics, such as cordierite, in general, and are used in such a state that they are accommodated within a casing that is made of metal. In a case where the technique that is set forth in Japanese Unexamined Patent Publication (KOKAI) Gazette No. 2005-325,771 is applied to such DPFs, since electromagnetic waves are shielded by the casing, it is not possible to wind the primary coil and secondary coil around the casing's outer periphery. Therefore, the coils should be wound around a DPF inside the casing.

However, exhaust gases distribute within the casing, and accordingly it becomes such a high temperature as 1,000° C. at the time of recovering the DPF forcibly. Moreover, since being also an oxidizing atmosphere is multiplied adversely at the time of recovering it forcibly, the coils have deteriorated early. Therefore, it is not practical to apply the technique being set forth in the aforementioned gazette to the instance when estimating the collection amount of PMs on DPFs.

Moreover, in Japanese Unexamined Patent Publication (KOKAI) Gazette No. 10-220,219, an exhaust-gas converting apparatus is proposed, exhaust-gas converting apparatus in which an amount of PMs is detected by measuring an intensity of electromagnetic wave with a microwave sensor. In this technique, an adhesion amount of PMs is detected as follows: a detection position of microwave is fixed by utilizing the facts that a dielectric constant and induction loss of a filter change when PMs deposit onto the filter, then the phase of microwave changes inside the filter, and eventually an intensity of the microwave changes; then an intensity of the microwave at that location is measured; and then the adhesion amount of PMs is detected by means of a change in the resulting intensity of the microwave.

However, since the filter's dielectric constant and induction loss come under the influence of temperatures, it is needed to do temperature correction; moreover, since an electromagnetic-field intensity is detected with the microwave sensor while utilizing a standing wave, not a direct phase-difference measurement, it is difficult to separate the effect of the microwave's attenuation by the one-point measurement, and accordingly there is such a problem that it cannot be detected with good accuracy. Consequently, it is needed to evaluate it in a comprehensive manner by carrying out the measurement at a plurality of locations; alternatively, it is needed to do troublesome evaluations using mapping data.

And, in the 2.45-GHz microwave that has been employed usually as a microwave, since the wavelength is 12 cm approximately so that the resolving power is low, it is not possible to detect the distribution of the collection amount of PMs, distribution whose size is this wavelength or less. Accordingly, it is not possible to prevent melt loss of the filter, melt loss which is caused as follows: PMs have deposited locally and thereby high temperatures have arisen locally, because of thermorunaway, at the time of the control for recycling the filter.

Patent Literature No. 1: Japanese Unexamined Patent Publication (KOKAI) Gazette No. 2005-325,771; and
Patent Literature No. 2: Japanese Unexamined Patent Publication (KOKAI) Gazette No. 10-220,219

DISCLOSURE OF THE INVENTION

Assignment to be Solved by the Invention

The present invention is one which has been done in view of the aforementioned circumstances, and it is an assignment to be solved to detect a collection amount of particulate matters, such PMs, which absorb electromagnetic waves, with ease and with high accuracy.

Means for Solving the Assignment

A characteristic of a collection-amount detection method for particulate matters according to the present invention which solves the aforementioned assignment lies in that: it is a collection-amount estimation method for estimating a collection amount of particulate matters, which have been collected in a collector container, by putting the collector container in place in a flow passage in which gases including the particulate matters distribute, and it includes:
an emission step of emitting electromagnetic waves whose frequency is dozens of GHz-a few of THz onto the collector container from the outside of the collector container; and
a detection step of detecting an intensity of the electromagnetic waves that have transmitted through the collector container, and then substituting the intensity into a relational expression between intensity and collection amount that have been determined in advance, thereby computing a collection amount of the particulate matters.

Moreover, a characteristic of a collection-amount detection apparatus for particulate matters according to the present invention lies in that: it includes:
a collector container being put in place in a flow passage in which gases including particulate matters distribute;
an electromagnetic-wave emitting means for emitting electromagnetic waves whose frequency is dozens of GHz-a few of THz onto the collector container from the outside of the collector container;
an electromagnetic-wave receiving means for detecting an intensity of the electromagnetic waves that have transmitted through the collector container; and
a computing means for computing a collection amount of the particulate matters from the intensity that has been detected with the electromagnetic-wave receiving means.

In addition, a characteristic of an exhaust-gas converting apparatus according to the present invention lies in that: it includes:
a filter being put in place in an exhaust-gas flow passage, and being for collecting PMs in which carbon makes the majority;
an accommodator container for accommodating the filter therein;
an electromagnetic-wave emitting means for emitting electromagnetic waves whose frequency is dozens of GHz-a few of THz onto the filter through an incident window that is formed in the accommodator container;
an electromagnetic-wave receiving means for detecting an intensity of the electromagnetic waves that have transmitted through the filter and have then radiated through a radiation window that is formed in the accommodator container; and
a computing means for computing a collection amount of PMs from the intensity that has been detected with the electromagnetic-wave receiving means.

In the exhaust-gas converting apparatus according to the present invention, it is desirable that the computing means can calculate an absorption coefficient of the electromagnetic waves at the filter, onto which PMs have been collected, from a value being detected by means of the electromagnetic-wave receiving means, and then computes a collection amount of PMs from a ratio with respect to an absorption coefficient of the electromagnetic waves, absorption coefficient which has been measured in advance, at the filter alone onto which no PMs are collected. Moreover, it is preferable that it can be further equipped with a reducing-agent supplying means for supplying a reducing agent into exhaust gases on an upstream side of the filter; and it is desirable that it can be further equipped with an estimating means for estimating the collection amount of PMs that have been collected onto the filter; and a controlling means for controlling driving of the reducing-agent supplying means based on the collection amount of PMs, collection amount which has been estimated by means of the estimating means.

Effect of the Invention

In accordance with the collection-amount detection method for particulate matters and collection-amount detection apparatus therefor according to the present invention, it is possible to detect a collection amount with high accuracy even by one-point measurement, because they use electromagnetic waves whose frequency is dozens of GHz-a few of THz (the wavelength being on mm level), and because they detect the collection amount utilizing the absorption of the electromagnetic waves by means of particulate matters.

And, in accordance with the exhaust-gas converting apparatus according to the present invention, it is possible to prevent melt loss of the filter, melt loss which results from thermorunaway, by carrying out a recycling process in a state where a collection amount of PMs does not become too much, because it is possible to detect the distribution of in the collection amount with good accuracy. Moreover, fuel consumption also improves, because it is possible to make a reducing-agent supply amount into exhaust gases minimum at the time of the recycling process.

EXPLANATION ON REFERENCE NUMERALS

Figure 1:
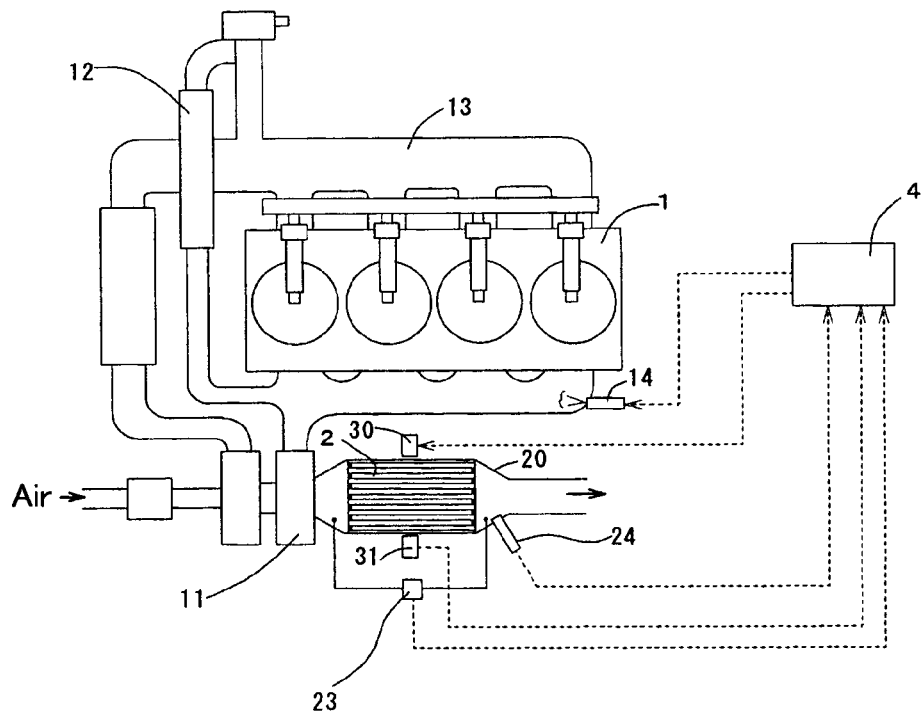
FIG. 1 is a block diagram of an exhaust-gas converting apparatus that is directed to an example according to the present invention.

1: Engine; 2: Filter; 4: ECU;
14: Injection Nozzle; 20: Converter; 21: Incident Window;
22: Radiation Window; 23: Differential-pressure Sensor;
    24: Temperature Sensor;
30: Microwave Transmitter; and 31: Microwave Receiver

BEST MODE FOR CARRYING OUT THE INVENTION

A collection-amount detection apparatus according to the present invention includes a collector container being put in place in a flow passage in which gases including particulate matters distribute, an electromagnetic-wave emitting means for emitting electromagnetic waves whose frequency is dozens of GHz-a few of THz onto the collector container from the outside of the collector container, an electromagnetic-wave receiving means for detecting an intensity of the electromagnetic waves that have transmitted through the collector container, and a computing means for computing a collection amount of the particulate matters from the intensity that has been detected with the electromagnetic-wave receiving means.

The "particulate matters" being referred to in the present invention are not limited especially as far as they are a substance that absorbs millimeter-wave-level microwaves whose frequency is dozens of GHz-a few of THz, and that eventually converts their energy into thermal energy; and it is possible to exemplify PMs in which carbon makes the majority, magnetic powders such as ferrite flours, and the like.

Moreover, in the present invention, millimeter-wave-level microwaves whose frequency is dozens of GHz-a few of THz are used. When the frequency is lower than this range, they become likely to transmit through the particulate matters that have been collected, and accordingly the detection accuracy of the collection amount lowers. Moreover, when the frequency becomes higher than this range, they become less likely to transmit through the particulate matters that have been collected, and consequently the detection accuracy amount lowers likewise. It is especially preferable to use a frequency in the vicinity of 600 GHz.

The collector container is one which is put in place in a flow passage in which gases including particulate matters distribute. As for this collector container, the following are used: those which can transmit millimeter-wave-level microwaves whose frequency is dozens of GHz-a few of THz. It does not matter even if a part of the microwaves are absorbed. In the case of an exhaust-gas converting apparatus, filters that are made of ceramics such as cordierite, silicon nitride and alumina are used representatively.

The electromagnetic-wave emitting means is a means for emitting electromagnetic waves whose frequency is dozens of GHz-a few of THz onto the collector container from the outside of the collector container; and it is possible to use magnetrons, and the like, therefor. Although it is desirable to emit the electromagnetic waves directly onto the collector container, the electromagnetic waves are emitted by way of an incident window, which is formed in the collector container and which is capable of transmitting the electromagnetic waves with dozens of GHz-a few of THz, in the case of a collector container such as an exhaust-gas converting filter that is accommodated in an accommodator container being made of metal. As for this incident window's quality of material, it is possible to use ceramics, such as cordierite, silicon nitride and alumina, glass, and so forth.

The electromagnetic-wave receiving means is one which detects an intensity of the electromagnetic waves that have transmitted through the collector container, and it is possible to use those having been known publicly, such as microwave sensors. It is desirable that the electromagnetic-wave receiving means can be put in place on the opposite side to the electromagnetic-wave emitting means with respect to the collector container, and that it can be put in place in proximity to the collector container. However, in the case of an exhaust-gas converting apparatus, it is constituted so as to receive the electromagnetic waves with dozens of GHz-a few of THz by way of a radiation window, which is formed in the collector container and which is capable of transmitting the electromagnetic waves, because there is a fear that the electromagnetic-receiving means might be degraded by means of heat. This radiation window can be formed of a quality of material, which is the same as those for the incident window, and which exhibits heat resistance.

The electromagnetic-wave emitting means, and the electromagnetic-wave receiving means are disposed so that they are positioned on the opposite sides to each other with respect to the collector container. For example, in the case of a cylindrically-configured collector container such as a honeycomb filter, it is possible to put them in place on both of its opposite sides, respectively, in the diametric direction. Alternatively, on an exhaust-gas inlet side and on an exhaust-gas outlet side, it is also preferable to put them in place so that each of them can be positioned on the opposite sides to each other on a plane that involves each of the axes. By doing thusly, it is possible to detect the collection amount of PMs over the entire length in the exhaust-gas flow direction.

The computing means computes a collection amount of the particulate matters from an electromagnetic-wave intensity that has been detected with the electromagnetic-wave receiving means. Specifically, it computes the collection amount of the particulate matters by substituting the electromagnetic-wave intensity, which has been detected with the electromagnetic-wave receiving means, into a relational expression between intensity and collection amount that have been determined in advance.

Since it is often the case that the collector container itself absorbs the electromagnetic waves whose frequency is dozens of GHz-a few of THz to a certain extent, a receiving intensity of the collector container alone is measured in the first place as a blank, receiving intensity which is for the collector container that is in such a state that no particulate matters are collected thereon. In this way, it is possible to calculate the collection amount of the particulate matters from a difference between that and another receiving intensity in such a state that the particulate matters are collected thereon.

In the case of an exhaust-gas converting apparatus, it is desirable that the computing means can compute an absorption coefficient of the electromagnetic waves at the filter, onto which PMs have been collected, from a value being detected by means of the electromagnetic-wave receiving means, and can then compute a collection amount of PMs from a ratio with respect to an absorption coefficient of the electromagnetic waves, absorption coefficient which has been measured in advance, at the filter alone onto which no PMs are collected. Since the relationship between the collection amount of PMs and the absorption coefficient makes a linear expression, regardless of various factors such as temperatures, by taking the absorption coefficients of the electromagnetic waves as indexes, it is possible to carryout the calculation of the collection amount of PMs with ease and with high accuracy. Note that the absorption coefficient is expressed by the logarithm of transmissivity, and the transmissivity is a proportion of radiation output with respect to incident output.

In an exhaust-gas converting apparatus, when the collection amount of PMs that have been collected onto the filter gets greater, the pressure loss rises to adversely affect engine performance. Therefore, the following countermeasures are needed: replacing the filter; alternatively carrying out a recycling process in which the filter is heated to burn the collected PMs, and the like. Since replacing the filter is not practical, the recycling process has been carried out in general.

Hence, it is desirable to further provide the exhaust-gas converting apparatus according to the present invention with a reducing-gas supplying means for supplying a reducing agent into exhaust gases on an upstream side of said filter. It is even allowable that it can be a means for supplying a reducing agent directly into exhaust gases; or it is also allowable that it can be a means for supplying a reducing agent indirectly into exhaust gases by post-injecting the reducing agent inside a cylinder. When the temperature of the filter becomes higher than an ignition temperature of the reducing agent, it is possible to burn PMs to recycle the filter, because the reducing agent burns within the filter and then the filter becomes high temperatures of 600° C. or more, for instance, by means of the resulting combustion heat. As for this reducing-agent supplying means, pumps, injectors, and the like, are available.

Moreover, it is also preferable to put an oxidizing catalyst in place on an upstream side of the filter, or to form a catalytic layer onto the filter. By doing thusly, even when the temperature of the filter is low temperatures, it is possible to oxidize and then burn the reducing agent by means of catalyst, and accordingly it becomes feasible to recycle the filter by means of the resulting combustion heat.

In the case of using a reducing-agent supplying means, it is desirable to dispose an estimating means for estimating the collection amount of PMs that have been collected onto said filter; and a controlling means for controlling driving of the reducing-agent supplying means based on the collection amount of PMs, collection amount which has been estimated by means of the estimating means. Since it is possible to drive the reducing-agent supplying means at optimum timings by means of this, fuel consumption improves. It is possible for the estimating means to estimate the collection amount of PMs that have been collected onto the filter from the following: differential pressures between those on the filter's upstream side and those on the downstream side; driving times of engine; records of traveling conditions, and the like.

At the time of recycle processing, it is also preferable that the estimating means can estimate an amount of PMs that remain within the filter based on at least one of a value being detected by a differential-pressure detecting means for detecting a differential pressure between an upstream side of the filter and a downstream side thereof, and a value being detected by a temperature sensor for detecting a temperature of the filter. When estimating the amount of remaining PMs based on a value that is detected by the differential-pressure estimating means, carrying out the recycle processing wastefully is prevented, and consequently fuel consumption improves furthermore. Moreover, estimating the amount of remaining PMs based on a value that is detected by the temperature sensor, the filter is inhibited from becoming high temperatures excessively so that it is possible to prevent the melt loss.

Note that water is also an electromagnetic-wave absorber and accordingly an water content within the filter exerts influences to the detected values; it is therefore desirable to estimate an amount of PMs having been collected onto the filter while taking the water content, which is detected using a moisture sensor, or the like, also into account.

EXAMPLE

Hereinafter, the present invention will be explained in detail by means of an example.

An exhaust-gas converting apparatus according to the present example is illustrated in FIG. 1. To an exhaust manifold 10 of a diesel engine 1, a converter 20 is connected, converter 20 that is made of steel and in which a cylindrically-configured filter 2 is accommodated. A major part of exhaust gases from the exhaust manifold 10 flow within the converter 20, and are discharged after passing through the filter 2; and a part of the exhaust gases are returned to an intake manifold 13 of the diesel engine 1 by way of a turbocharger 11 and intercooler 12. Moreover, an injection nozzle 14 is put in place in the exhaust manifold 10, and it is thereby constructed so that light oil is injected into the exhaust gases intermittently.

The filter 2 makes a honeycomb-configured wall-flow structure that has inlet-side cells being plugged on the exhaust-gas downstream side, outlet-side cells neighboring the inlet-side cells and being plugged on the exhaust-gas upstream side, and porous cellular partition walls demarcating the inlet-side cells and outlet-side cells and having a large number of pores; and is formed of cordierite.

Figure 2:
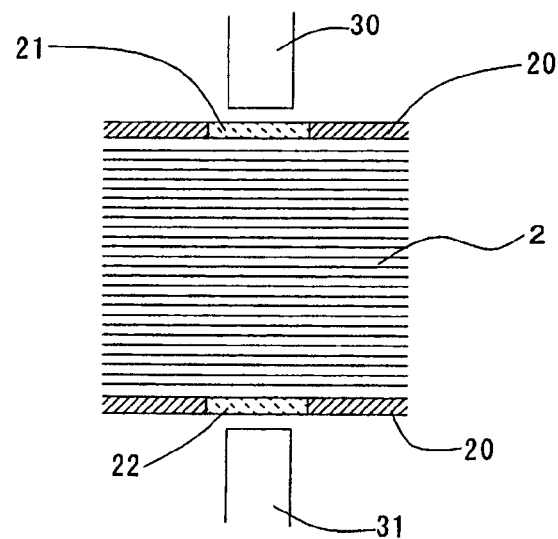
FIG. 2 is a major-part-enlarged cross-sectional diagram of an exhaust-gas converting apparatus that is directed to an example according to the present invention.
Figure 3:
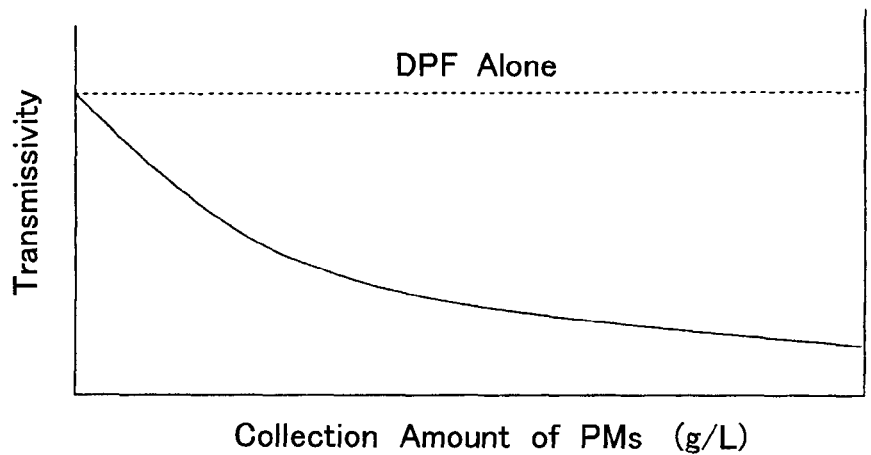
FIG. 3 is a graph for illustrating a relationship between collection amounts of PMs and transmissivities.

To the converter 20, a microwave transmitter 30, and a microwave receiver 31 are set in place on the opposite outer sides at their substantially central section. The microwave transmitter 30, and the microwave receiver 31 are put in place respectively on both of the opposite sides that hold the filter 2 between them on a plane that involves the central axis of the filter 2. Driving of the microwave transmitter 30 is controlled by means of an ECU 4, and signals that have been received by means of the microwave receiver 31 are being input to the ECU 4. As illustrated in FIG. 2 and FIG. 3, in the converter 20's surfaces that face the microwave transmitter 30 and the microwave receiver 31, an incident window 21 and a radiation window 22 are formed, incident window 21 and radiation window 22 that comprise alumina, and through which microwaves can transmit.

Moreover, to the converter 20, a differential-pressure sensor 23 is put in place, differential-pressure sensor 23 which is for detecting a difference between an exhaust-gas pressure on an upstream side of the filter 2 and another exhaust-gas pressure on a downstream side thereof, and output signals of the differential-pressure sensor 23 are being input to the ECU 4. In addition, to the converter 20, a temperature sensor 24 is set in place, temperature sensor 24 which is for detecting an exhaust-gas temperature on a downstream side of the filter 2.

In this exhaust-gas converting apparatus, a brand-new filter 2 was used first of all; then a millimeter wave having 600 GHz was transmitted with an input intensity $I_i$ from the microwave transmitter 30 without driving the engine 1; and then an output intensity $I_o$, which had been received by the microwave receiver 31, was measured. The energy of the millimeter wave that had been transmitted is absorbed by means of the incident window 21, filter 2 and radiation window 22 to a certain extent to become "$I_i > I_o$," and the transmissivity is expressed by "$I_o/I_i$."

And, from Mathematical Formula 1, an absorption coefficient $\alpha_{r(reference)}$ for a case of being the filter 2 alone is calculated.

$$\text{Absorption Coefficient } \alpha_r = -\ln(I_o/I_i) \quad \text{[Mathematical Formula 1]}$$

Next, the filter 2 on which PMs had been collected in various collection amounts in advance were made ready in a quantity of plural pieces, and then they were accommodated within the converter 2, respectively. And, without driving the engine 1, a millimeter wave having 600 GHz was transmitted with an input intensity $I_i$ from the microwave transmitter 30, and then an output intensity $I_o$, which had been received by the microwave receiver 31, was measured, respectively.

A relationship between the collection amount at each of the filters 2 and the transmissivity ($I_o/I_i$) is illustrated in FIG. 3. As can be seen from FIG. 3, the relationship between the collection amount of PMs and the transmissivity does not make any linear expression. Therefore, complicated calculations are needed in order to estimate the collection amount of PMs from the transmissivity.

Hence, an absorption coefficient $\alpha_{w(with\ PMs)}$ for a case of using the filter 2 on which PMs had been collected was measured. And, a "PMs Ratio," namely, a ratio with respect to the absorption coefficient $\alpha_{r(reference)}$ for a case of being the filter 2 alone, is calculated using Mathematical Formula 2, and then a relationship between the collection amount of PMs and the "PMs ratio" is illustrated in FIG. 4.

$$\text{PMs Ratio} = \{(\alpha_{w(with\ PMs)})/(\alpha_{r(reference)})\} \quad \text{[Mathematical Formula 2]}$$

Figure 4:
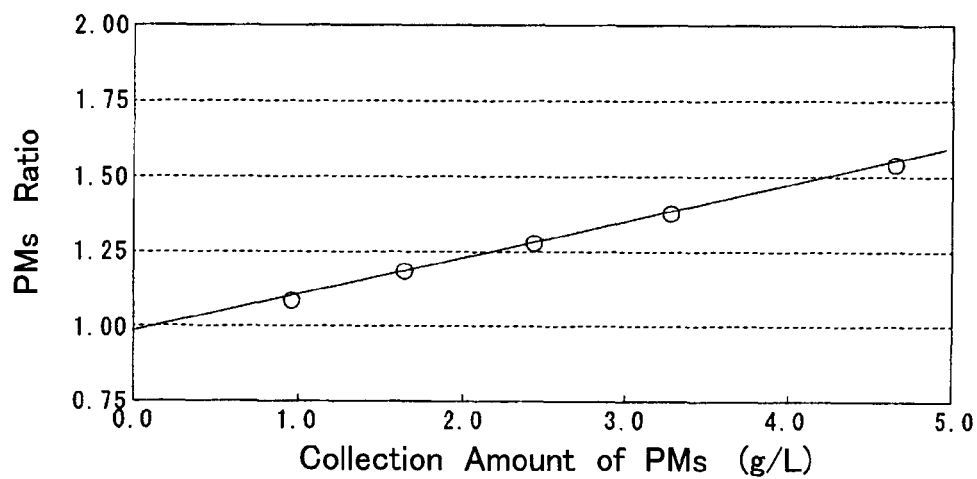
FIG. 4 is a graph for illustrating a relationship between collection amounts of PMs and "PMs Ratios."

From FIG. 4, it is apparent that the relationship between the collection amount of PMs and the "PMs Ratio" makes a linear expression, and therefore it is possible to detect the collection amount of PMs with ease and with high accuracy by measuring the "PMs Ratio."

Hence, in the present example, the microwave transmitter 30 is driven always in such a state that the engine 1 is driven, and then the ECU 4 observes the "PMs Ratio" always. And, the collection amount of PMs is calculated from the relational expression shown in FIG. 4; then, in a case where it surpasses a predetermined value that has been set up as such a state that the collection amount of PMs is not becoming too much, the ECU 4 drives the injection nozzle 14 to supply light oil into the exhaust gases in a predetermined amount. At this time, although it is preferable that the microwave transmitter 30 can be turned off not to be driven, it is allowable that its driving can be continued.

The light oil, which has been supplied into the exhaust gases, flows into the filter 2, and is ignited and then burned by mean of the filter 2's heat. The filter 2 undergoes temperature increment to about 600° C. or more by means of the resulting combustion heat. At this time, the ECU 4 always observes the output signal of the differential-pressure sensor 23 and the output signal of the temperature sensor 24. And, the addition of the light oil is continued until the difference between the pressure on the filter 2's upstream side and the pressure on the downstream side becomes a predetermined value or less. However, in a case where the temperature of the exhaust gases, which have been discharged from the filter 2, should have surpassed a predetermined value, the ECU 4 stops the driving of the injection nozzle 4, thereby preventing the melt loss of the filter 2.

Specifically, the relationship between the "PMs Ratio" and the collection amount of PMs makes a linear expression by taking the "PMs Ratio" as an index, it is possible to detect the collection amount of PMs with ease and with high accuracy by measuring the "PMs Ratio." Moreover, it is possible to detect the distribution of the collected amount of PMs with good accuracy by using millimeter-wave-level microwaves. Therefore, since it is possible to carry out the recycling process for filters securely in such a state that the collection amount of PMs is not becoming too much, it is possible to prevent melt loss, which results from thermorunaway, preemptively. In addition, since it is possible to keep the driving of the injection nozzle 14 minimum, fuel consumption improves.

The invention claimed is:

1. A collection-amount detection method for particulate matters, the collection-amount detection method being a collection-amount estimation method for estimating a collection amount of particulate matters, which have been collected in a collector container, by putting the collector container in place in a flow passage in which gases including the particulate matters distribute, and including:
    an emission step of emitting electromagnetic waves whose wave length is millimeter wave length or submillimeter wave length onto the collector container from the outside of the collector container; and
    a detection step of detecting an intensity of the electromagnetic waves that have transmitted through the collector container, and then substituting the intensity into a relational expression between intensity and collection amount that have been determined in advance, thereby computing a collection amount of the particulate matters.

2. A collection-amount detection apparatus for particulate matters, including:
    a collector container being put in place in a flow passage in which gases including particulate matters distribute;
    an electromagnetic-wave emitting means for emitting electromagnetic waves whose wave length is millimeter wave length or submillimeter wave length onto the collector container from the outside of the collector container;
    an electromagnetic-wave receiving means for detecting an intensity of the electromagnetic waves that have transmitted through the collector container; and
    a computing means for computing a collection amount of the particulate matters from the intensity that has been detected with the electromagnetic-wave receiving means.

3. An exhaust-gas converting apparatus including:
a filter being put in place in an exhaust-gas flow passage, and being for collecting particulate matters in which carbon makes the majority;
an accommodator container for accommodating the filter therein;
an electromagnetic-wave emitting means for emitting electromagnetic waves whose wave length is millimeter wave length or submillimeter wave length onto the filter through an incident window that is formed in the accommodator container;
an electromagnetic-wave receiving means for detecting an intensity of the electromagnetic waves that have transmitted through the filter and have then radiated through a radiation window that is formed in the accommodator container; and
a computing means for computing a collection amount of particulate matters from the intensity that has been detected with the electromagnetic-wave receiving means.

4. The exhaust-gas converting apparatus as set forth in claim 3, wherein said computing means calculates an absorption coefficient of said electromagnetic waves at said filter, onto which particulate matters have been collected, from a value being detected by means of said electromagnetic-wave receiving means, and then computes a collection amount of particulate matters from a ratio with respect to an absorption coefficient of said electromagnetic waves, absorption coefficient which has been measured in advance, at said filter alone onto which no particulate matters are collected.

5. The exhaust-gas converting apparatus as set forth in claim 4, being further equipped with a reducing-agent supplying means for supplying a reducing agent into exhaust gases on an upstream side of said filter.

6. The exhaust-gas converting apparatus as set forth in claim 5, being further equipped with:
an estimating means for estimating said collection amount of particulate matters that have been collected onto said filter; and
a controlling means for controlling driving of said reducing-agent supplying means based on said collection amount of particulate matters, collection amount which has been estimated by means of said estimating means.

7. The exhaust-gas converting apparatus as set forth in claim 6, wherein said estimating means estimates the collection amount of particulate matters based on at least one of a value being detected by a differential-pressure detecting means for detecting a differential pressure between an upstream side of said filter and a downstream side thereof, and a value being detected by a temperature sensor for detecting a temperature of said filter.

8. The exhaust-gas converting apparatus as set forth in claim 3 being further equipped with a reducing-agent supplying means for supplying a reducing agent into exhaust gases on an upstream side of said filter.

9. The exhaust-gas converting apparatus as set forth in claim 8 being further equipped with:
an estimating means for estimating said collection amount of particulate matters that have been collected onto said filter; and
a controlling means for controlling driving of said reducing-agent supplying means based on said collection amount of particulate matters, collection amount which has been estimated by means of said estimating means.

10. The exhaust-gas converting apparatus as set forth in claim 9, wherein said estimating means estimates the collection amount of particulate matters based on at least one of a value being detected by a differential-pressure detecting means for detecting a differential pressure between an upstream side of said filter and a downstream side thereof, and a value being detected by a temperature sensor for detecting a temperature of said filter.

* * * * *